United States Patent
Ido et al.

(10) Patent No.: US 7,123,618 B2
(45) Date of Patent: Oct. 17, 2006

(54) DATA TRANSMITTING APPARATUS AND DATA RECEIVING APPARATUS

(75) Inventors: Daiji Ido, Yokohama (JP); Koji Imura, Machida (JP); Akihiro Miyazaki, Sakai (JP); Koichi Hata, Katano (JP)

(73) Assignee: Matsushta Electric Industrial Co., Ltd., Osaka (JP)

( * ) Notice: Subject to any disclaimer, the term of this patent is extended or adjusted under 35 U.S.C. 154(b) by 970 days.

(21) Appl. No.: 10/069,934

(22) PCT Filed: Jun. 18, 2001

(86) PCT No.: PCT/JP01/05178

§ 371 (c)(1),
(2), (4) Date: Mar. 1, 2002

(87) PCT Pub. No.: WO02/05515

PCT Pub. Date: Jan. 17, 2002

(65) Prior Publication Data
US 2002/0122434 A1    Sep. 5, 2002

(30) Foreign Application Priority Data
Jul. 7, 2000    (JP) .............................. 2000-206616

(51) Int. Cl.
*H04L 12/28* (2006.01)
*H04L 12/56* (2006.01)

(52) U.S. Cl. ................ 370/394; 370/395.1; 370/395.5; 714/18; 714/746; 714/748

(58) Field of Classification Search ................ 370/394, 370/389, 501, 229, 252, 235, 230–232, 237, 370/242, 253, 216, 254, 226, 227, 312, 356, 370/390, 392, 408, 352, 503, 241, 474, 13, 370/14, 16, 17, 58.2, 395.1, 395.5, 395.52; 709/230, 238, 227, 239, 235, 224, 232, 106, 709/107, 225; 340/825.2, 3.51, 825.08, 825.07, 340/825.16, 825.17, 825.01; 714/748, 18, 714/798; 379/32, 33, 34, 92
See application file for complete search history.

(56) References Cited

U.S. PATENT DOCUMENTS
5,049,873 A * 9/1991 Robins et al. ......... 340/825.01
(Continued)

FOREIGN PATENT DOCUMENTS
JP    10-112884    * 4/1998
(Continued)

OTHER PUBLICATIONS

Zink et al.: "LC-RTP (Loss Collection RTP): Reliability for Video Caching in the Internet", Parallel and Distributed Systems: Workshops, Seventh International Conf. ON, 2000 Iwate, Japan, Jul. 4-7, 2000, Los Alamitos, CA, USA, IEEE Comp. Soc. pp. 281-286.*
(Continued)

Primary Examiner—Seema S. Rao
Assistant Examiner—Jamal A. Fox
(74) Attorney, Agent, or Firm—Stevens, Davis, Miller & Mosher, LLP (57) ABSTRACT

A data transmitting apparatus and a data receiving apparatus, which are capable of retransmitting a packet even when a retransmission request is made by a client after transmitting a session close notice packet to the client. A session is closed by a session closing means 105 when a predetermined period of time has passed after transmitting the session close notice packet, which is generated by a control command generating means 102 as the session close notice packet, from a packet transmitting means 103 to the client.

4 Claims, 7 Drawing Sheets

U.S. PATENT DOCUMENTS

| | | | |
|---|---|---|---|
| 5,918,002 A | 6/1999 | Klemets et al. | |
| 6,505,253 B1 * | 1/2003 | Chiu et al. | 709/235 |
| 6,507,562 B1 * | 1/2003 | Kadansky et al. | 370/216 |
| 6,526,022 B1 * | 2/2003 | Chiu et al. | 370/229 |

FOREIGN PATENT DOCUMENTS

| | | |
|---|---|---|
| JP | 10112884 | 4/1998 |
| JP | 11341046 | 12/1999 |
| JP | 2000151749 | 5/2000 |

OTHER PUBLICATIONS

Kasano, Hidematsu, "Internet RFC Jiten", Ascii Shuppankyoku, pp. 540-542, Nov. 1, 1998 with English translation.

International Search Report dated Sep. 11, 2001.

Supplementary European Search Report dated Dec. 18, 2002.

M. Zink, et al.: "LC-RTP (Loss Collection RTP): Reliability for Video Caching in the Internet" Parallel and Distributed Systems: Workshops, Seventh International Conference on, 2000 Iwate, Japan Jul. 4-7, 2000, Los Alamitos, CA, USA, IEEE Comput. Soc. US, Jul. 4, 2000, pp. 281-286, XP010523884, ISBN: 0-7695-0571-6.

* cited by examiner

DATA TRANSMITTING APPARATUS AND DATA RECEIVING APPARATUS

TECHNICAL FIELD

The present invention relates to a data transmitting apparatus and a data receiving apparatus appropriate for effectively transmitting digital data such as images and speeches or the like under communication circumstances where code error or congestion is easily generated.

BACKGROUND ART

Conventionally, when transmitting digital data such as images and speeches or the like (hereinafter, referred to as "multimedia data") using a packet communication channel such as the internet or the like, since, different from data transmission, a real time characteristic is required rather than a reliability characteristic, protocols such as the RTP (Real-time Transport Protocol) and the UDP (User Datagram Protocol) or the like, which are specified by the IETF (Internet Engineering Task Force), are utilized.

Now, a description will be made as to a transmission method of multimedia data using the RTP.

First of all, a server that transmits data and a client that receives the data establish a session therebetween using a protocol such as the RTSP (Real Time Streaming Protocol) or the like. Then, the server generates RTP packets, which are including video, image and/or audio data as a payload (mainly, information to be transmitted excluding control information in each protocol data unit) encoded in accordance with an encoding system such as the MPEG (Moving Picture Expert Group) or the like, and a packet generation time and a sequence number representing the order of the packets as a header, and transmits the packets to the client. The client extracts video, image and/or audio data from the payload of the RTP packets received from the server, and plays back or stores the data. When the transmission of every multimedia data has completed, or when terminating the communication, the server transmits a packet, which represents session close notice command (hereinafter, referred to as "session close notice packet") to the client, and closes the session and returns to the initial status.

In the case of carrying out transmission of multimedia data as described above, in packet communication networks, due to a congestion of a network or bit error, the client sometimes fails to receive packets, or even when the client succeeds in receiving the packets, the packets are sometimes incorrect packets. In such a case, particularly, when an important packet is missing, it results in a considerable deterioration in the image quality and the sound quality.

However, in the sequence number of the foregoing RTP packets, the order of the packets is recorded sequentially. Accordingly, it is possible to check the numbers every time when a packet is received, and at that point in time when a discontinuity is detected in the numbers, it is recognized that there is a packet that has failed to be received. When it is determined that the missing packet is necessary, it is possible for the client to transmit a retransmission request to the server, and the packet can be received again from the server.

However, in a conventional data transmitting apparatus, there is such a disadvantage; that is, when a retransmission request is made from a client to a server after a session close notice packet has been transmitted to the client, since the server has already returned to the initial status, the packet can not be retransmitted.

Figure 1:
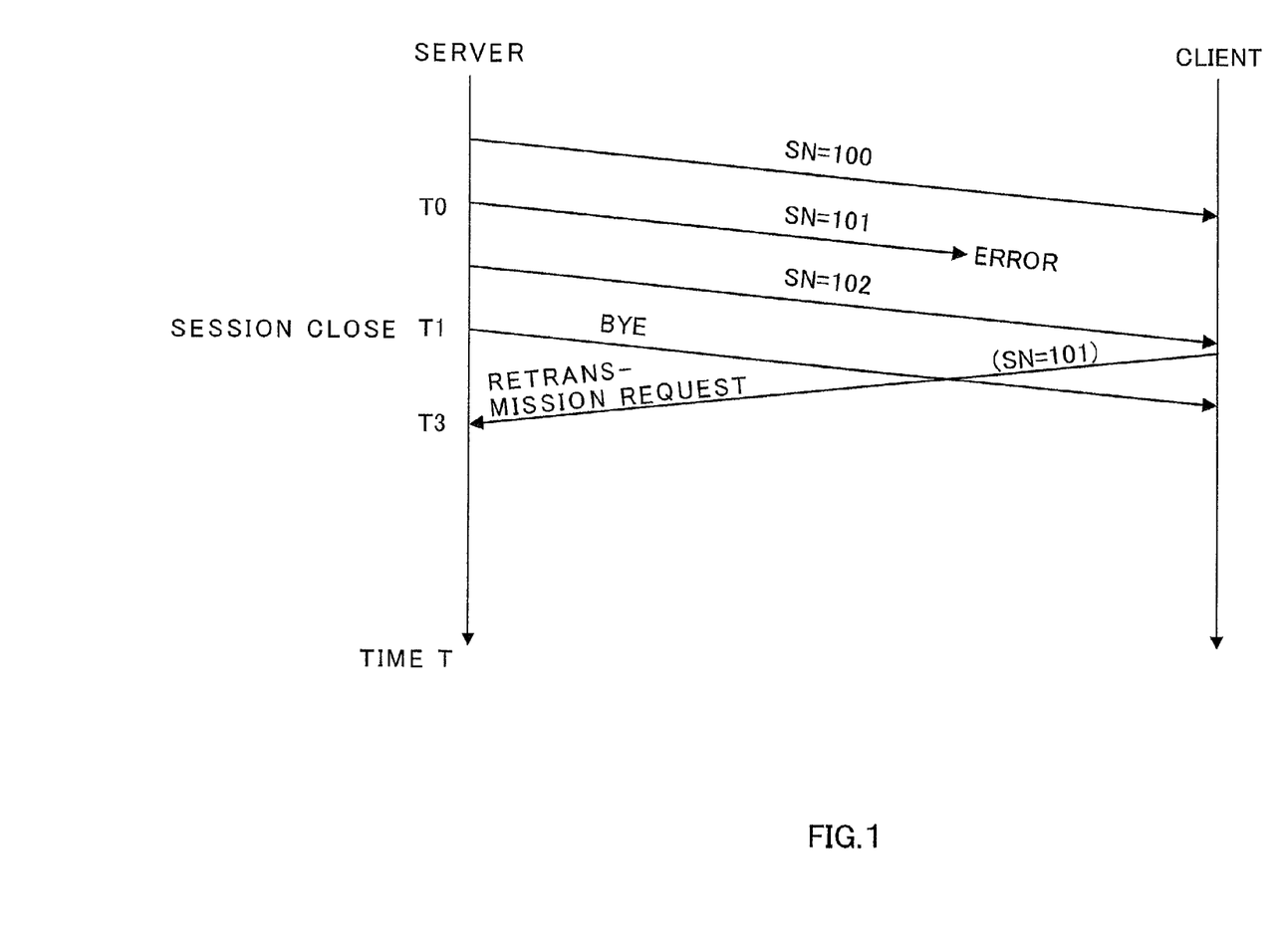
FIG. 1 is a sequence diagram illustrating a session closing operation in a conventional transmitting apparatus.

Referring to FIG. 1, a detailed description will be made as to a session closing operation in a conventional data transmitting apparatus. FIG. 1 is a sequence diagram illustrating a session closing operation in the conventional transmitting apparatus. In FIG. 1, a reference character SN represents a sequence number. Since the SN increases by 1 every time when a server transmits a packet, a client can detect missing of the packet when the packet is lost.

In FIG. 1, it is assumed that a packet of SN=101 transmitted by the server at a time T0 is lost. In this case, after receiving a packet of SN=100, the client detects that the packet of SN=101 is missing at that point in time when a packet of SN=102 is received. And, the client transmits a retransmission request packet to the server. However, when the server has transmitted a session close notice packet (BYE packet) at a time T1 and has already closed the session, since the server receives the retransmission request packet for the packet of SN=101 at a time T3, the server can not transmit the packet requested to retransmit.

DISCLOSURE OF INVENTION

An object of the present invention is to provide a data transmitting apparatus and a data receiving apparatus that are capable of transmitting a packet even when a retransmission request is made by a client after a session close notice packet has been transmitted to the client.

A theme of the present invention is to close a session by a session closing means at that point in time when a predetermined period of time has passed after transmitting a session close notice command generated by a control command generation means as a session close notice packet to the client via a packet transmitting means.

BEST MODE FOR CARRYING OUT THE INVENTION

Now, referring to the attached drawings, embodiments of the present invention will be described in detail.

(First Embodiment)

Figure 2:
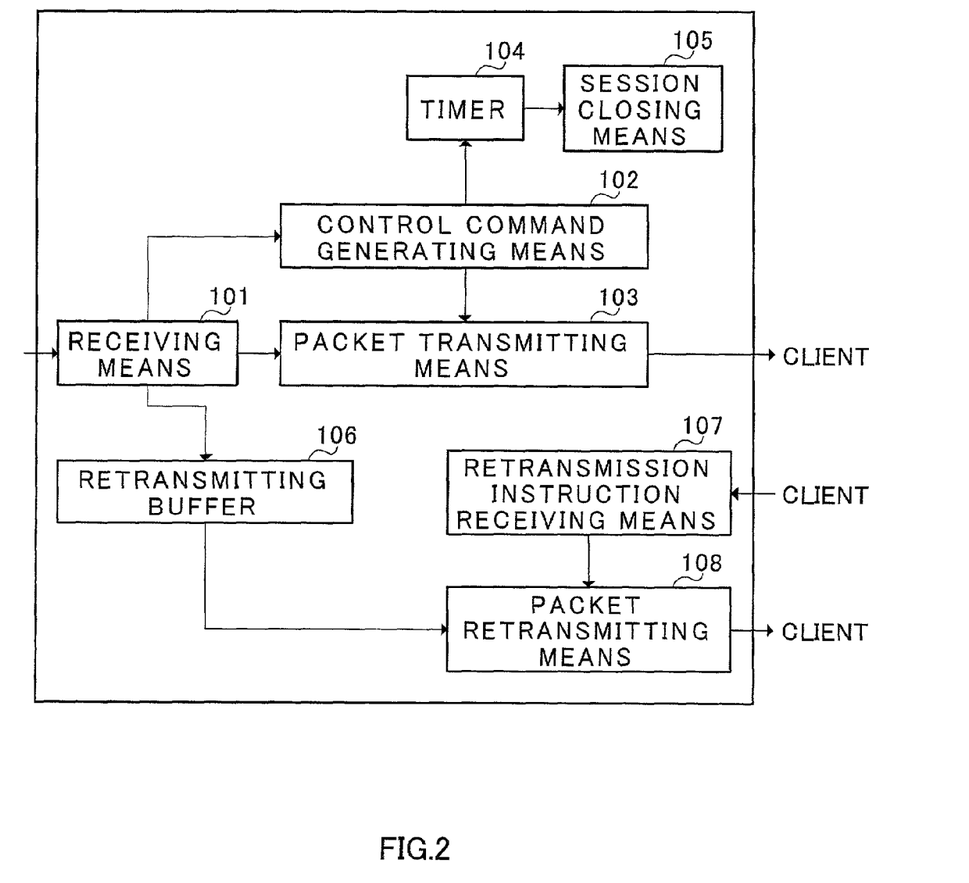
FIG. 2 is a block diagram illustrating a configuration of a data transmitting apparatus according to a first embodiment of the present invention.

FIG. 2 is a block diagram illustrating a configuration of a data transmitting apparatus according to a first embodiment of the present invention. The data transmitting apparatus is a section that provides a data transmitting/receiving function in a server apparatus that distributes multimedia data via a packet communication network.

In the data transmitting apparatus shown in FIG. 2, a receiving means 101 receives multimedia data taking the form of packet from an application of the server apparatus.

A control command generating means 102 generates control commands such as the session close command or the like, and outputs the control commands to a packet transmitting means 103. Also, the control command generating means 102 outputs the session close command to the packet transmitting means 103, and at the same time, notices it to a timer 104.

The packet transmitting means 103 transmits packets received by the receiving means 101 to a client. Also, the packet transmitting means 103 transmits a packet of a control command output from the control command generating means 102 to the client.

The timer 104 has such functions that, at the same time when the timer 104 receives a notice of the session close command from the control command generating means 102, the timer initiates a time measuring operation and notices that a predetermined period of time, which is set previously, has passed. To be concrete, while carrying out the time measuring operation, the timer 104 decreases a preset time data at predetermined intervals, and at a time when the time data reaches "0", outputs a signal indicating that the time has passed.

A session closing means 105 determines whether the predetermined period of time has passed or not since a notice of the session close command according to a time-passed signal output from the timer 104. To be concrete, the session closing means 105 determines that the predetermined period of time has passed when the time-passed signal of the timer 104 has changed into an active state. The case that the time-passed signal of the timer 104 has changed into an active state means that a predetermined period of time, which is set previously, has passed. Hereinafter, the case that the time-passed signal of the timer 104 changes into an active state will be referred to as simply "become active".

A retransmitting buffer 106 is a memory for buffering (temporary storing) the packets received by the receiving means 101.

A retransmission instruction receiving means 107 is a section that receives a retransmission request from the client, and notices an identification information of the packet for which the retransmission request has been made.

A packet retransimitting means 108 reads out a corresponding packet from the retransmitting buffer 106 according to the identification information of the packet noticed from the retransmission instruction receiving means 107, and retransmits the packet to the client.

Further, herein, a description is made as to a case that the receiving means 101 receives multimedia data taking the form of packet from the application of the server apparatus, and the packet transmitting means 103 and the packet retransmitting means 108 transmit the packet to the client. However, it may be adapted so that the receiving means 101 receives multimedia data not taking the form of packet, and the packet transmitting means 103 and the packet retransmitting means 108 generate packets from the multimedia data.

Figure 3:
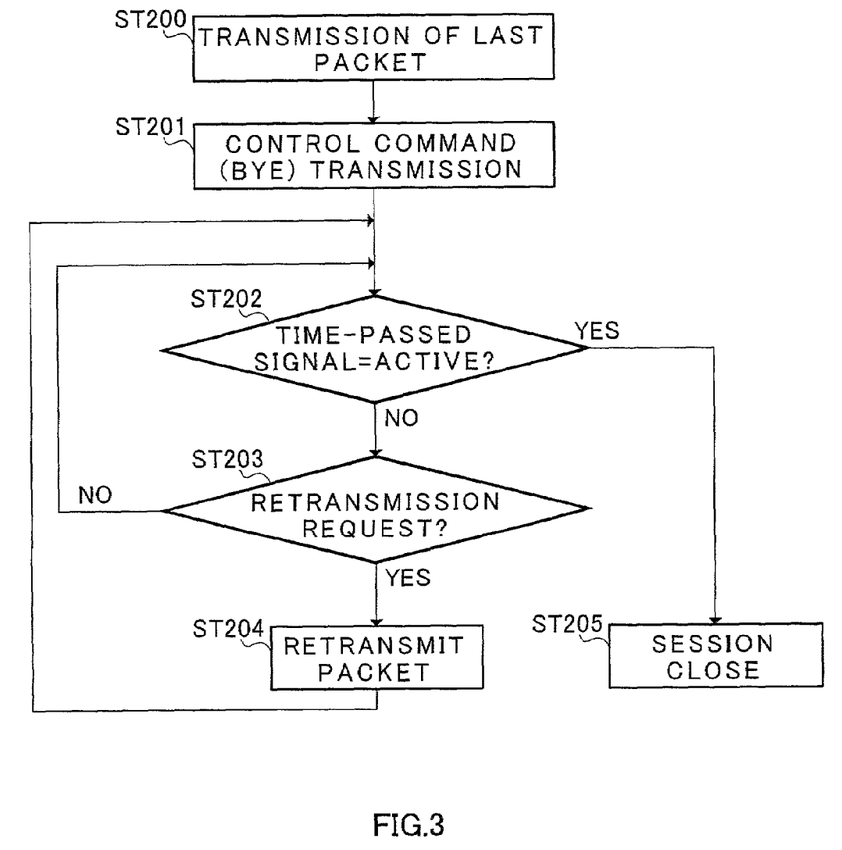
FIG. 3 is a flow sheet illustrating a packet retransmitting operation after transmitting the session close notice packet in the data transmitting apparatus according to the first embodiment of the present invention.

Next, referring to the flow sheet shown in FIG. 3, a description will be made as to a packet retransmitting operation in the data transmitting apparatus, which has the foregoing configuration, after the session close notice packet has been transmitted.

In the data transmitting apparatus, the packet transmitting means 103 transmits packets in accordance with, for example, the RTP, and transmits the last packet to the client (ST200). After the last packet has been transmitted, the control command generating means 102 generates a BYE command, which is a control command that notices closing of a session.

Figure 4:
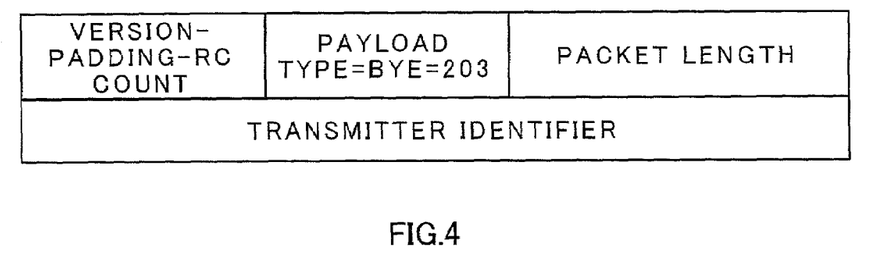
FIG. 4 is a diagram illustrating a format of the session close notice packet transmitted by the data transmitting apparatus according to the first embodiment of the present invention.

Now, a description will be made as to a format of a packet that constitutes the session close notice command (BYE command) generated by the control command generating means 102. FIG. 4 is a diagram illustrating the format of the session close notice packet. As shown in FIG. 4, No.203 that indicates the session close notice (BYE) is stored in the payload type. Also, a packet full length measured in 32-bit increments is stored in the packet length. Further, in the transmitter identifier, an identifier of a sequence of numbers that enables a packet receiving party to uniquely identify the transmitting party is stored.

The control command generating means 102 outputs the BYE command, which has been generated in a manner as described above, to the packet transmitting means 103. The packet transmitting means 103 transmits the BYE command to the client (ST201). When outputting the session close command, the control command generating means 102 notices it to the timer 104. After receiving the notice, the timer 104 begins a time measuring operation.

In ST201, when the packet transmitting means 103 transmits the BYE command to the client, the session closing means 105 monitors the time-passed signal of the timer 104 and determines whether the signal has become active or not (ST202). And, when the time-passed signal of the timer 104 has become active, the session closing means carries out a process to close the session (ST205). Thus, the data transmitting apparatus returns to the initial status.

While, for a period of time until the time-passed signal of the timer 104 becomes active, the retransmission instruction receiving means 107 determines whether the server has received any retransmission request from the client or not (ST203).

At this time, when the server has not received any retransmission request, the process is returned to ST202, and the determination whether the time-passed signal of the timer 104 has become active or not is retransmitted by the session closing means 105. While, when the server has received any retransmission request, the retransmission instruction receiving means 107 notices the identification information of the packet, which is requested to retransmit by the client, to the packet retransmitting means 108. According to the identification information, the packet retransmitting means 108 reads out the corresponding packet from the retransmitting buffer 106 and transmits the packet to the client (ST204).

And after the packet retransmitting means 108 has transmitted the corresponding packet to the client, the process is returned to the ST202.

Figure 5:
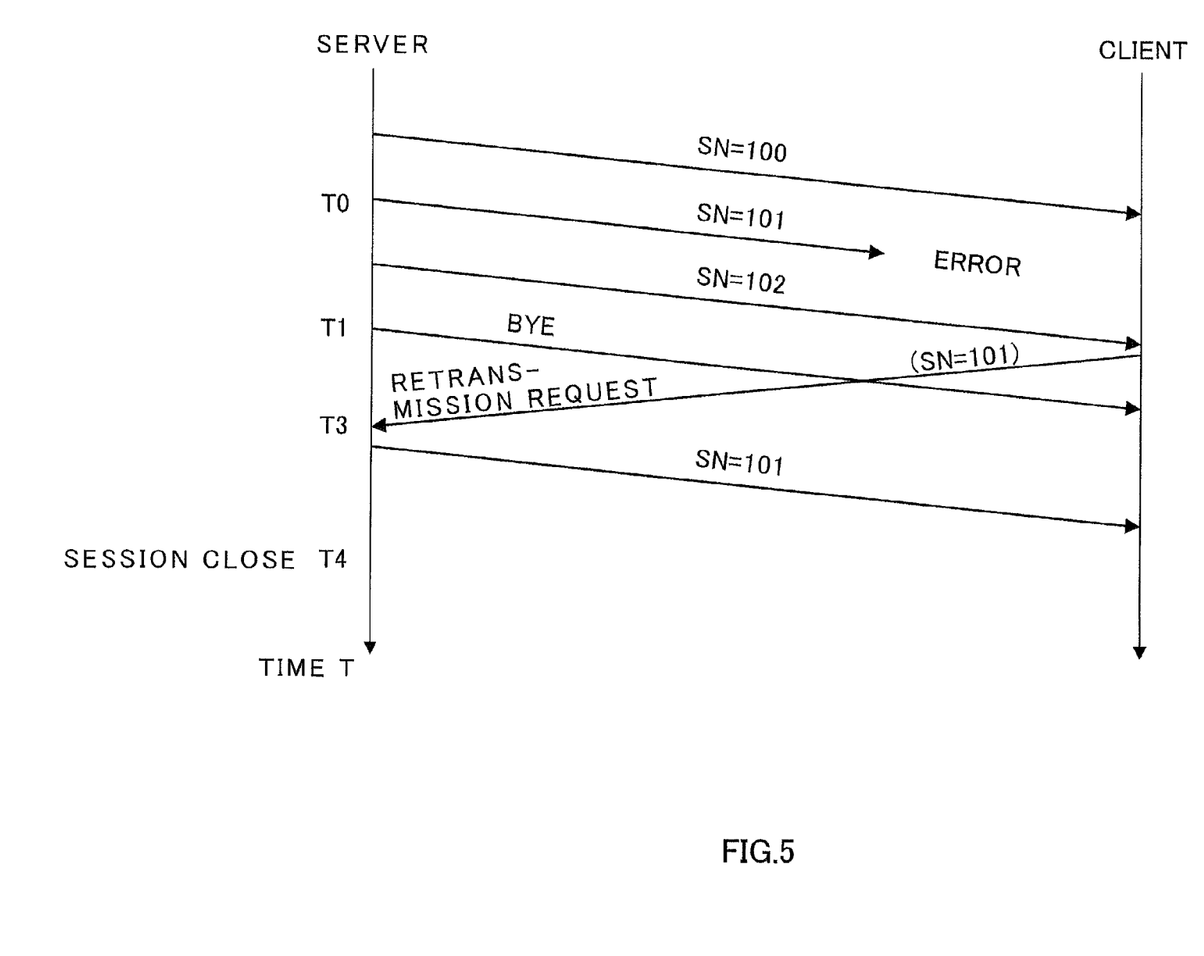
FIG. 5 is a sequence diagram illustrating an operation of the data transmitting apparatus according to the first embodiment of the present invention in a case that the data transmitting apparatus receives a retransmission instruction after transmitting the session close notice packet.

FIG. 5 is a sequence diagram illustrating an operation of the data transmitting apparatus in the case that the data transmitting apparatus has received a retransmission instruction after transmitting the session close notice packet.

In FIG. 5, it is assumed that the client, after receiving a packet of which sequence number (SN) is 100, has failed to receive a packet of SN=101. In this case, the client detects that the packet of SN=101 is missing by receiving the packet of SN=102 after receiving the packet of SN=100. When missing of the packet is detected, the client transmits a packet requesting to retransmit the packet of SN=101 to the data transmitting apparatus. The data transmitting apparatus receives the retransmission request at a time T3.

The data transmitting apparatus has transmitted the BYE command to the client at a time T1. And after transmitting the BYE command and until a predetermined period of time has passed, the data transmitting apparatus continues to open the session. In FIG. 5, the session is continued from the time T1 when the BYE command is transmitted to a time T4. Therefore, at the time T3 when the retransmission request is received from the client, since the session is continued, the data transmitting apparatus can retransmit the packet of SN=101 to the client in accordance with the retransmission instruction.

As described above, according to the data transmitting apparatus of the first embodiment, after transmitting the BYE command to the client, since it is enabled to delay closing the session and returning to the initial status by a predetermined period of time set in the timer 104, even when a retransmission is requested after a BYE command has been transmitted, the requested packet can be retransmitted.

Further, in the first embodiment, although a description has been made as to a configuration in which the packet transmitting means 103 transmits the BYE command after all of packet data has been transmitted; it is not limited to this, but it may be a configuration in which the BYE command is transmitted on demand during the process that all of packet data is transmitted.

Furthermore, in the first embodiment, although the control command generating means 102 generates the session close notice packet in accordance with the BYE packet format of the RTP shown in FIG. 4, the session close notice packet may be generated in accordance with another format. Still further, a session closing method according to another protocol may be adopted.

(Second Embodiment)

Figure 6:
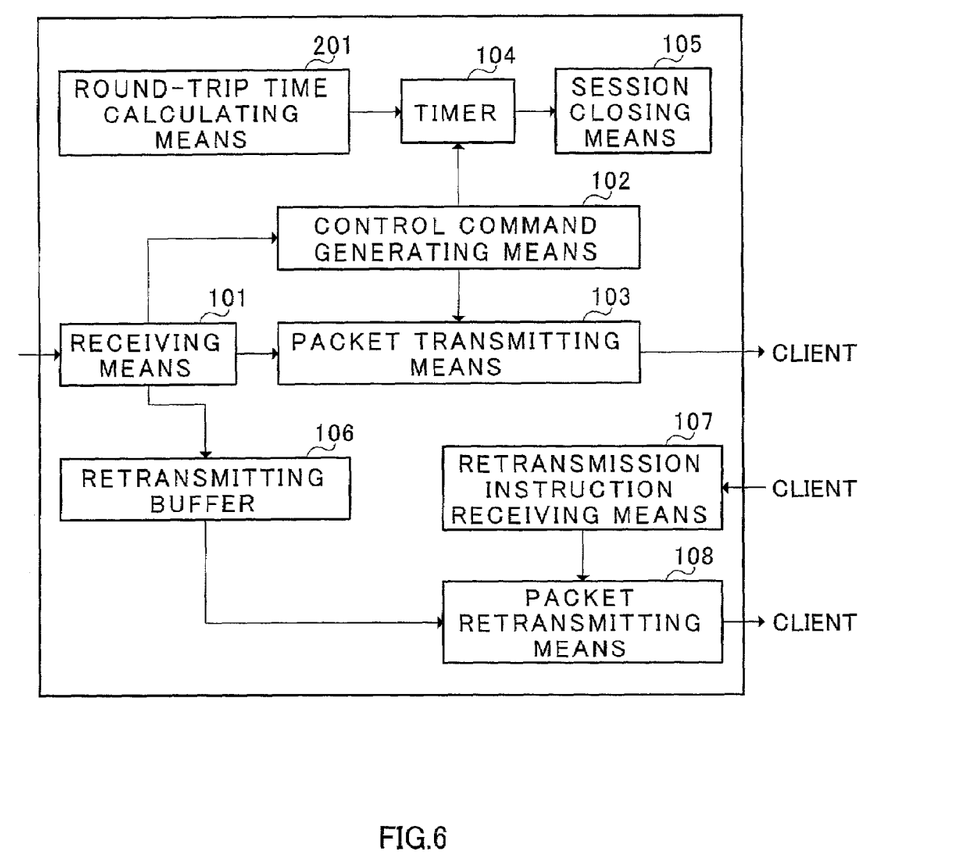
FIG. 6 is a block diagram illustrating a configuration of a data transmitting apparatus according to a second embodiment of the present invention.

FIG. 6 is a block diagram illustrating a configuration of a data transmitting apparatus according to a second embodiment of the present invention.

The data transmitting apparatus according to the second embodiment is, as shown in FIG. 6, different from the data transmitting apparatus according to the first embodiment in a point only that a round-trip time calculating means 201 that calculates a time required for a data to make a round-trip between the data transmitting apparatus and the client (hereinafter, referred to as "data round-trip time") is included therein. In FIG. 6, the components, which are the same as those shown in FIG. 2, are given the same reference numerals and the description thereof will be omitted.

In FIG. 6, the round-trip time calculating means 201 calculates the latest data round-trip time between the data transmitting apparatus and the client. To be concrete, the round-trip time calculating means 201 obtains the data round-trip time in transmitting/receiving of data between the data transmitting apparatus and the client in accordance with a predetermined algorithm.

The latest data round-trip time obtained by the round-trip time calculating means 201 is set as a time data in the timer 104. As described in the first embodiment, when a notice that the session close command has been transmitted is received from the control command generating means 102, the timer 104 starts a measuring operation of the data round-trip time. And after the data round-trip time has passed, the session is closed by the session closing means 105.

As described above, according to the data transmitting apparatus of the second embodiment, since the session is closed when the data round-trip time between the server and the client has passed after transmitting the session close command to the client, it is enabled to prevent the session from being unnecessarily continued.

Further, since the session is closed according to the latest data round-trip time, the session can be closed according to the status of the present packet communication network.

Furthermore, when a shorter data round-trip time is set in the timer 104, the continuation time of the session is also shortened accompanying to this; when the continuation time of the session is shortened, since connection time to the packet communication network is also shortened, cost of the charge for telephone call or the like can be reduced.

Still further, in the second embodiment, although a description has been made as to a configuration in which a latest data round-trip time corresponding to a present packet communication network status is set as a predetermined period of time in the timer 104, it is not limited to this; i.e., while taking into consideration a buffering time of a packet data in the client, a sum of a data round-trip time and the buffering time may be set as a predetermined period of time in the timer 104. In this case, a session is closed while taking into consideration the buffering time also at the client. Accordingly, a session is continued for a period of time corresponding to the request of the client more precisely.

(Third Embodiment)

Figure 7:
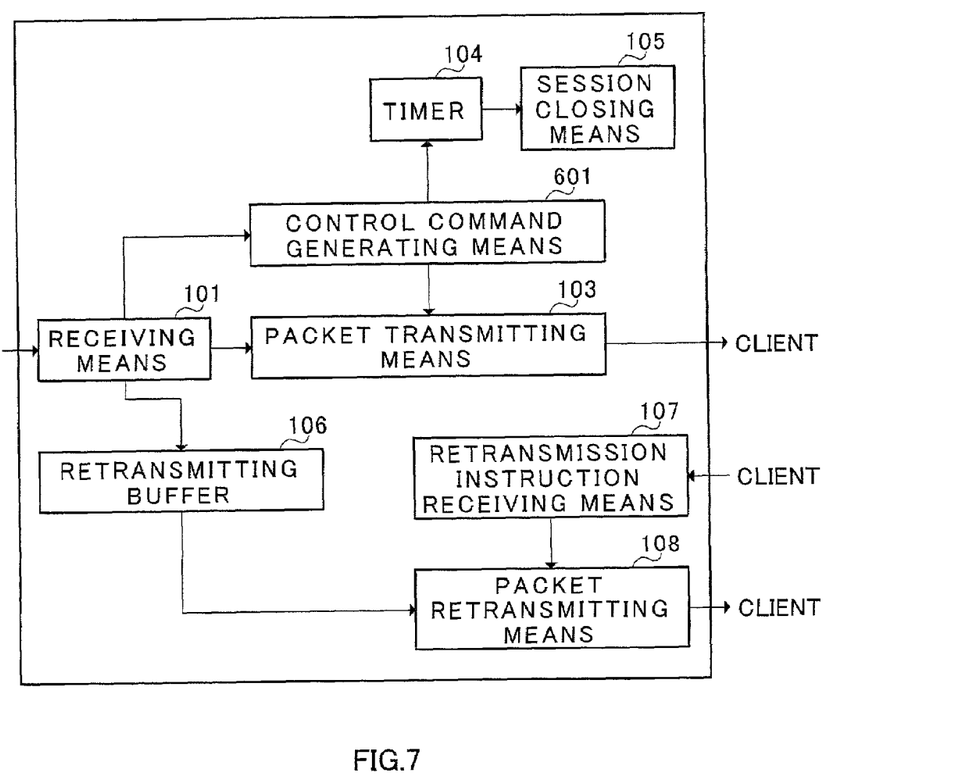
FIG. 7 is a block diagram illustrating a configuration of a data transmitting apparatus according to a third embodiment of the present invention.

FIG. 7 is a block diagram illustrating a configuration of a data transmitting apparatus according to a third embodiment of the present invention. The data transmitting apparatus according to the third embodiment is different from the data transmitting apparatus according to the first embodiment in a point only that a control command generating means 601 generates a packet based on a control command such as a session close and a time from the timer 104. In FIG. 7, the components, which are the same as those shown in FIG. 2, are given with the same reference numerals and the description thereof will be omitted.

In the data transmitting apparatus shown in FIG. 7, when generating the session close notice packet, the control command generating means 601 stores a period of time during which a session is continued after noticing a session close in the session close notice packet in addition to a packet information described in FIG. 4.

Figure 8:
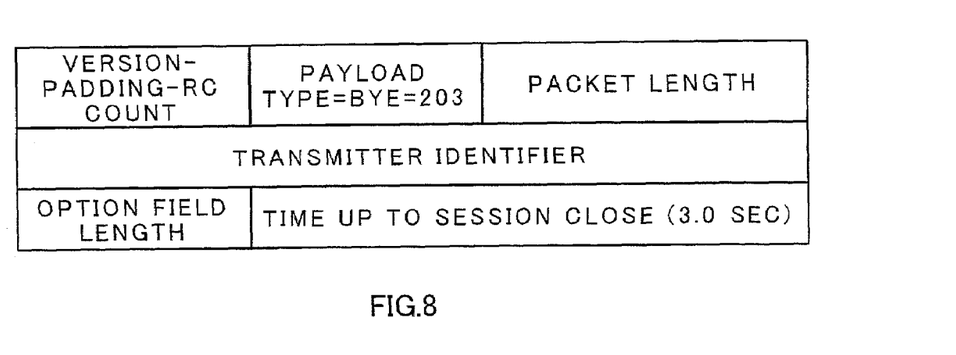
FIG. 8 is a diagram illustrating a format of the session close notice packet transmitted by the data transmitting apparatus according to the third embodiment of the present invention.

FIG. 8 is a diagram illustrating a format of the session close notice packet generated by the control command generating means 601. In addition to the format of the session close notice packet described in FIG. 4, an option field length in which a field length behind a transmitter identifier is stored and a period of time up to close the session is stored. In FIG. 8, although the period of time when a session is closed is set to "3.0 sec", it is not limited thereto, but it is settable to any desired time.

By transmitting the session close notice packet as described above to the client, the client can select a processing corresponding to the content thereof. For example, by detecting the time when the session is closed, which is stored in the session close notice packet, it is enabled to stop transmitting a retransmission request for a packet.

As described above, according to the data transmitting apparatus of the third embodiment, since a period of time from a point of time when a session close notice packet is transmitted to a point of time when a session is actually closed is noticed to the client, it is enabled for the client, by receiving the notice, to determine whether the data transmitting apparatus can retransmit the requested packet or not before the retransmission request is made. Thus, it is enabled to prevent a retransmission request from being transmitted from the client after the session has been actually closed. As a result, it is enabled to reduce the load of the traffic in a packet communication network.

(Fourth Embodiment)

Figure 9:
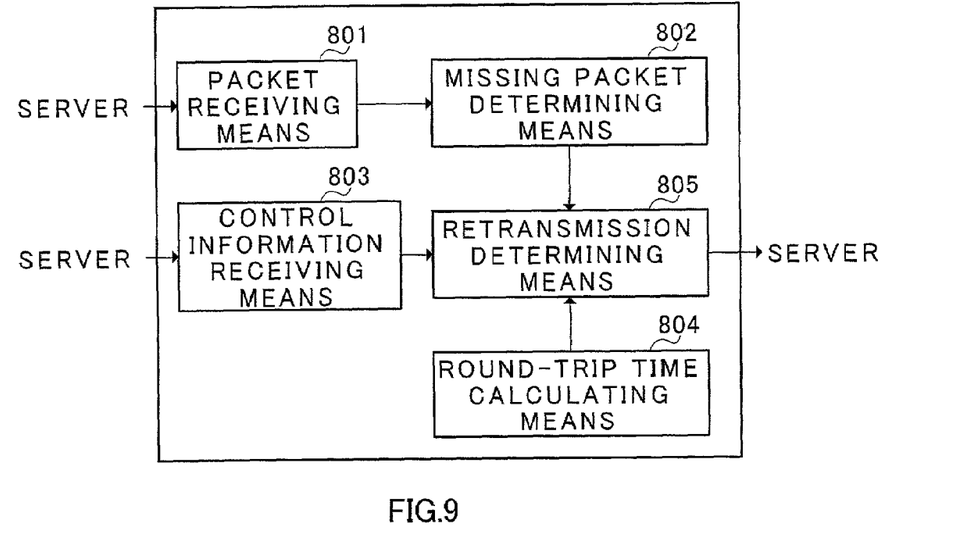
FIG. 9 is a block diagram illustrating a configuration of a data receiving apparatus according to a fourth embodiment of the present invention.

FIG. 9 is a block diagram illustrating a configuration of a data receiving apparatus according to a fourth embodiment of the present invention. The data receiving apparatus is a section that provides a data transmitting/receiving function in the client.

In the data receiving apparatus shown in FIG. 9, the packet receiving means 801 receives packets transmitted from the server via the packet communication network.

A missing packet determining means 802 determines of missing packet within received packets based on the sequence numbers given to the packets received by the packet receiving means 801. Also, the missing packet determining means 802 notices the determination result to a retransmission determination means 805, which will be described later.

A control information receiving means 803 receives control information such as the session close notice packet or the like. It is assumed that, in the session close notice packet received by the control information receiving means 803, a period of time that a session is continued (hereinafter, referred to as "session continuation time") set by the server is stored in a mode, for example, as described in the third embodiment.

A round-trip time calculating means 804 calculates a latest data round-trip time between the server and the data receiving apparatus. To be concrete, the round-trip time calculating means 804 obtains a data round-trip time in a data transmitting/receiving between the server and the data receiving apparatus in accordance with a predetermined algorithm.

Herein, although the round-trip time calculating means 804 calculates a latest data round-trip time between the server and the data receiving apparatus; it is not limited to this, but it may be adapted so that a predetermined period of time as a fixed value, which is previously set, is used.

The retransmission determining means 805 compares the large/small relationship between the session continuation time received by the control information receiving means 803 and the data round-trip time calculated by the round-trip time calculating means 804. And the retransmission determining means 805 determines that, only when the data round-trip time is smaller, the retransmission request is possible and transmits a retransmission request to the server.

Figure 10:
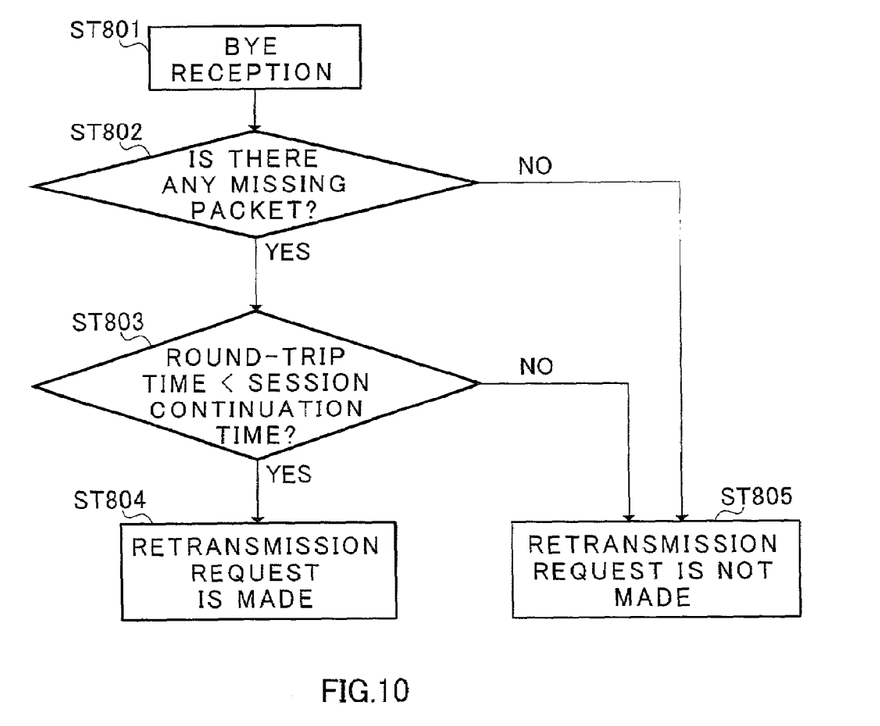
FIG. 10 is a flow sheet illustrating a retransmission determining operation after receiving the session close notice packet in the data receiving apparatus according to the fourth embodiment of the present invention.

Now, referring to the flow sheet shown in FIG. 10, a description will be made as to a retransmission determination operation after receiving the session close notice packet in the data receiving apparatus which has the foregoing configuration.

First of all, after receiving packets with the packet receiving means 801 in accordance with, for example, the RTP, the control information receiving means 803 receives the session close notice packet (BYE packet) from the server (ST801).

When the control information receiving means 803 receives the BYE packet, the missing packet determining means 802 determines whether there is any missing packet or not, which is lost before the BYE packet is received (ST802).

At this time, when there is no missing packet, the retransmission determining means 805 receives a notice of the fact from the missing packet determining means 802 and determines that the retransmission request is not needed, and the retransmission request to the server is not made (ST805). While, when there is any missing packet, the retransmission determining means 805 receives a notice of the fact from the missing packet determining means 802 and compares the large/small relationship between the latest data round-trip time calculated by the round-trip time calculating means 804 and the session continuation time stored in the BYE packet (ST803).

As a result of the comparison, when the data round-trip time is larger, the retransmission determining means 805 determines that the retransmission request is impossible and does not transmit any retransmission request to the server (ST805). While, when the data round-trip time is smaller, the retransmission determining means 805 determines that the retransmission request is possible and transmits a retransmission request to the server (ST804).

As describe above, according to the data receiving apparatus of the fourth embodiment, since even after the session close notice packet has been received, the retransmission request can be transmitted, and further it is enabled to make a determination of the retransmission request while taking into the consideration the data round-trip time and the session continuation time of the server, it is enabled to prevent the client from transmitting a retransmission request that is received at a time that the server can not retransmit the packet. Thus, it is enabled to reduce the load of the traffic in a packet communication network.

Further, in the embodiments 1 to 4, although the descriptions have been made as to a data transmitting apparatus and a data receiving apparatus that transmit/receive packets between a sever and a client via packet communication network, it is not limited to this; i.e., it is also possible to realize a transmitting/receiving system by disposing a repeater such as a gateway on a packet communication network, and the packets are transmitted/received via the repeater. In the case also where such transmitting/receiving system is constructed, the same effects as those of the embodiments described above can be obtained.

As described above, according to the present invention, since it is adapted so that a session is continued for a predetermined period of time after transmitting the session close notice packet to a client, it is possible to retransmit a packet to the client even when a retransmission request is received from the client after the session close notice packet has been transmitted.

The description of the present invention is based on the Japanese Patent Application No. 2000-206616 filed on Jul. 7, 2000, and entire content thereof is incorporated herein.

INDUSTRIAL APPLICABILITY

The present invention is applicable to a data transmitting apparatus and a data receiving apparatus appropriate for effectively transmitting digital data such as images and speeches or the like under communication circumstances where code error or congestion is easily generated.

The invention claim is:

1. A packet transmitting apparatus comprising:
a calculator that calculates a round trip time required to communicate to and from a destination as a session continuation time;
a transmitter that transmits to the destination a plurality of packets, successively, and a session close notice packet, containing an indication of the calculated session continuation time and a communication session closing, after the plurality of packets are transmitted;
a retransmission component that retransmits to the destination, during a communication session, an errantly received packet in response to a retransmission request issued by the destination; and
a closing component that closes the communication session for transmitting the plurality of packets and retransmitting errantly received packets, after the expiration of the calculated session continuation time since the transmission of the session close notice packet to the destination, wherein:
packets retransmitted before the transmission of the session close notice packet are transmitted with the plurality of packets transmitted by the transmitter, and
after the session close notice packet is transmitted, the retransmitting component retransmits only packets that are determined to be missing at the destination before the session close notice packet is received at the destination.

2. A data receiving apparatus comprising:
a receiver that receives packets from a data transmitting source via a packet communication network;
a missing packet determining component that determines whether an expected packet is missing or not;
a round trip time calculating component that calculates a round trip time required to communicate between the data transmitting source and the data receiving apparatus;
a control information receiving component that receives a session close notice packet, which includes an indication of a session continuation time, from the data transmitting source; and
a retransmission requesting component that issues, during a retransmission communication session, a retransmission request for a packet determined to be missing, wherein:
after the session close notice packet is received, the retransmission requesting component issues a retransmission request only for packets that are determined to be missing before the session close notice packet is received, and the retransmission communication session ends when the calculated round trip time exceeds the remaining part of the session continuation time indicated in the received session close notice packet.

3. A packet transmission method comprising:
calculating a round trip time required to communicate to and from a destination as a session continuation time;
transmitting to the destination a plurality of packets, successively;
transmitting a session close notice packet, containing an indication of the calculated session continuation time and a communication session closing, after the plurality of packets are transmitted;
retransmitting to the destination, during a communication session, an errantly received packet in response to a retransmission request issued by the destination; and
closing the communication session for transmitting the plurality of packets and retransmitting errantly received packets after the expiration of the calculated session continuation time since transmitting the session close notice packet to the destination, wherein:
packets retransmitted before the transmission of the session close notice packet are transmitted with the transmitted plurality of packets, and
after the session close notice packet is transmitted, retransmission is performed only for packets that are determined to be missing at the destination before the session close notice packet is received at the destination.

4. A packet receiving method comprising:
receiving packets from a data transmitting source via a packet communication network;
determining whether an expected packet is missing or not;
calculating a round trip time required to communicate between the data transmitting source and a data receiving apparatus;
receiving a session close notice packet, which includes an indication of a session continuation time, from the data transmitting source;
issuing, during a retransmission communication session, a retransmission request for a packet determined to be missing;
closing the retransmission communication session based on a result of comparison between the calculated round trip time and the remaining part of the session continuation time indicated in the received session close notice packet; and
after the session close notice packet is received, issuing a retransmission request only for packets that are determined to be missing before the session close notice packet is received.

* * * * *